(12) United States Patent
Yen et al.

(10) Patent No.: US 7,595,823 B2
(45) Date of Patent: Sep. 29, 2009

(54) PROVIDING OPTIMIZED DIGITAL IMAGES

(75) Inventors: Jonathan Yen, San Jose, CA (US); Mei Chen, Los Altos, CA (US); Ramin Samadani, Menlo Park, CA (US); Pere Obrador, Mountain View, CA (US); Huitao Luo, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 556 days.

(21) Appl. No.: 11/060,526

(22) Filed: Feb. 17, 2005

(65) Prior Publication Data

US 2006/0181614 A1    Aug. 17, 2006

(51) Int. Cl.
H04N 5/262    (2006.01)
(52) U.S. Cl. .................................... 348/239; 348/218.1
(58) Field of Classification Search ............. 348/222.1, 348/218.1, 240.99, 223.1, 239, 231.6
See application file for complete search history.

(56) References Cited

U.S. PATENT DOCUMENTS

| | | | |
|---|---|---|---|
| 6,219,097 B1 * | 4/2001 | Kamishima et al. | 348/297 |
| 6,319,199 B1 * | 11/2001 | Sheehan et al. | 600/200 |
| 6,429,895 B1 * | 8/2002 | Onuki | 348/208.99 |
| 6,750,903 B1 * | 6/2004 | Miyatake et al. | 348/218.1 |
| 6,930,718 B2 * | 8/2005 | Parulski et al. | 348/333.11 |
| 7,317,479 B2 * | 1/2008 | Cazier et al. | 348/240.99 |
| 7,352,393 B2 * | 4/2008 | Sakamoto | 348/239 |
| 7,358,988 B1 * | 4/2008 | Konishi et al. | 348/222.1 |
| 7,365,780 B1 * | 4/2008 | Miyazaki | 348/231.6 |
| 7,382,403 B2 * | 6/2008 | Sakamoto | 348/230.1 |
| 2001/0030694 A1 * | 10/2001 | Abe | 348/223 |
| 2003/0147000 A1 * | 8/2003 | Shiraishi | 348/362 |
| 2003/0231241 A1 | 12/2003 | Iida | |
| 2004/0208475 A1 | 10/2004 | Ohmura et al. | |
| 2005/0013602 A1 * | 1/2005 | Ogawa | 396/157 |
| 2006/0028579 A1 * | 2/2006 | Sato | 348/362 |

OTHER PUBLICATIONS

U.S. Appl. No. 10/461,600, Chen.
U.S. Appl. No. 10/824,692, Chen.
Adelson, et al., "Pyramid Methods in Image Processing," RCA Engineer, 29-6, Nov./Dec. 1984.
"Auto Bracketing, The different types, and what they do," http://www.megapixel.net/cgi-bin/print.pl.
"HP Photosmart R507," Aug. 2, 2004 http://www.dpreview.com/news/0408/04080202hp_r507.asp.
Borman et al., "Spatial Resolution Enhancement of Low-Resolution Image Sequences A Comprehensive Review with Directions for Future Research," Jul. 8, 1998.

* cited by examiner

*Primary Examiner*—Jason Chan
*Assistant Examiner*—Gary C Vieaux

(57) ABSTRACT

An exemplary method for providing an optimized digital image comprises obtaining digital image data by a digital image capture device, based on the digital image data, automatically determining at least two setting types, and a plurality of setting values therefor, for capturing a plurality of digital images, automatically capturing the plurality of digital images using the digital image capture device, each image being captured with at least one setting value different than another image, and providing an optimized digital image based on the plurality of digital images. In one exemplary embodiment, the optimized image is selected from the plurality of digital images. In another exemplary embodiment, the optimized image is synthesized based on the plurality of digital images.

6 Claims, 9 Drawing Sheets

PROVIDING OPTIMIZED DIGITAL IMAGES

BACKGROUND

Novice and professional photographers alike are drawn to digital cameras by their many advantages over conventional film cameras. For instance, digital cameras allow a photographer to readily capture, review, and keep or delete multiple digital images of a scene in virtually real time. However, for non-professional photographers, it is still difficult to optimally capture a moment on a consistent basis even using digital cameras. Factors that may contribute to the "imperfection" of captured images include sensor limitations and inappropriate camera settings.

Many cameras have pre-defined categories of camera settings (e.g., portrait, landscape, close-up, etc.) that a photographer may select for a given scene type. By selecting a category suitable for a given scene prior to capturing an image, the camera is automatically adjusted to the pre-determined settings for that category of images.

In practice, these categories do not adequately cover all scenes. For example, a photographer may wish to capture a subject 5 feet away from the camera as well as the landscape 1000 feet behind the subject. In this case, it is inappropriate for the photographer to select either the portrait or landscape mode.

Even when a scene roughly falls within a category, the captured image may still be "imperfect" due to factors particular to that scene. For example, a portrait subject could be so strongly illuminated from behind that the halo around the subject confuses the camera, so that the flash-fill feature is not triggered. As a result, the subject will be underexposed.

Often, by the time the photographer realizes that the captured images are not quite right, the moment she wishes to capture has already passed.

Thus, a market exists for digital photography processes and devices that can automatically provide (e.g., by capturing or synthesizing) more optimized digital images.

SUMMARY

An exemplary method for providing an optimized digital image comprises obtaining digital image data by a digital image capture device, based on the digital image data, automatically determining at least two setting types, and a plurality of setting values therefor, for capturing a plurality of digital images, automatically capturing the plurality of digital images using the digital image capture device, each image being captured with at least one setting value different than another image, and providing an optimized digital image based on the plurality of digital images. In one exemplary embodiment, the optimized image is selected from the plurality of digital images. In another exemplary embodiment, the optimized image is synthesized based on the plurality of digital images.

Other embodiments and implementations are also described below.

DETAILED DESCRIPTION

I. Overview

Exemplary processes and systems for generating an optimized image are described herein.

Section II describes an exemplary process for providing an optimized image.

Section III describes exemplary system and processes for capturing an optimized image.

Section IV describes exemplary system and processes for synthesizing an optimized image.

Section V describes an exemplary operating environment.

II. An Exemplary Process for Providing an Optimized Image

Figure 1:
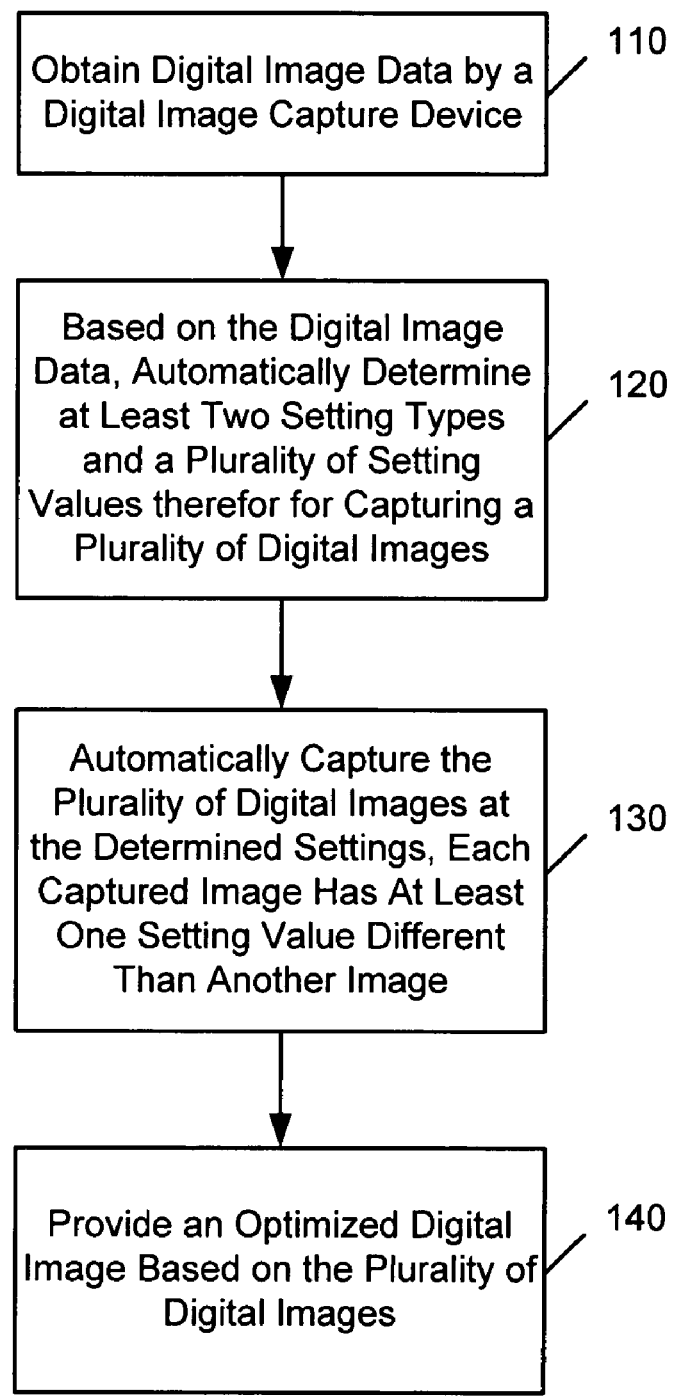
FIG. 1 illustrates an exemplary process for providing an optimized digital image.

FIG. 1 illustrates an exemplary process for providing an optimized image.

At block 110, digital image data are obtained by a digital image capture device. In an exemplary implementation, the digital image data comprise data of a captured digital image. However, the digital image data need not be of a captured image. For example, in another exemplary implementation, the digital image data may comprise data obtained of a scene using the digital image capture device without capturing a digital image (e.g., capturing the lighting condition of the scene by half-clicking the trigger of the image capture device, obtaining some image data via a sensor of the image capture device, etc.). In yet another exemplary implementation, the digital image data are video data. The digital image data may be captured by another image capture device and provided to the image capture device. The examples provided are merely illustrative. One skilled in the art will recognize that, depending on design choice, other techniques may be used to obtain digital image data of a scene.

An image capture device could be a camera, an optical image array (e.g., a scanner), a text-reading stylus (e.g., as used in computerized pen translators), a lens and imaging array, or any other device having image capturing capabilities, such as a camera-equipped cellular phone, PDA, etc. Thus, the term "image capture device" should be interpreted broadly to include any such imaging device.

At block 120, based on the digital image data, the digital image capture device automatically determines at least two setting types and a plurality of setting values for capturing a plurality of digital images. The setting types may include, without limitation: (i) shutter speed; (ii) aperture; (iii) lens focal length; (iv) flash operation; (v) redeye correction; (vi) white balance; (vii) automatic gain setting; (viii) resolution/image size (e.g., 640×480 vs. 1024×768 vs. 1600×1200); (ix) degree of compression (e.g., low vs. medium vs. high); (x) shooting mode (e.g., aperture-priority vs. shutter-priority vs. manual control); (xi) light metering mode (e.g., center spot vs. weighted vs. evaluative); (xii) special effects (e.g., black & white vs. vivid vs. neutral vs. sepia); (xiii) virtually any other setting type that can be adjusted by the image capture device.

At block 130, the plurality of digital images is automatically captured with the determined settings by the digital image capture device. Each image has at least one setting value different than the setting values of the other image(s).

At block 140, an optimized digital image is provided based on the plurality of captured digital images. As used herein, an optimized image need not be the best image in an absolute sense, but rather can be an image that better captures the scene (i.e., in terms of resolution, lighting, focus, and/or other measurable quantities).

In an exemplary embodiment, an optimized image is selected among the plurality of captured images. This embodiment will be described in more detail in Section III below. In another exemplary embodiment, an optimized image is synthesized based on the plurality of captured images. This embodiment will be described in more detail in Section IV below.

III. Exemplary System and Processes for Capturing an Optimized Digital Image

Figure 2:
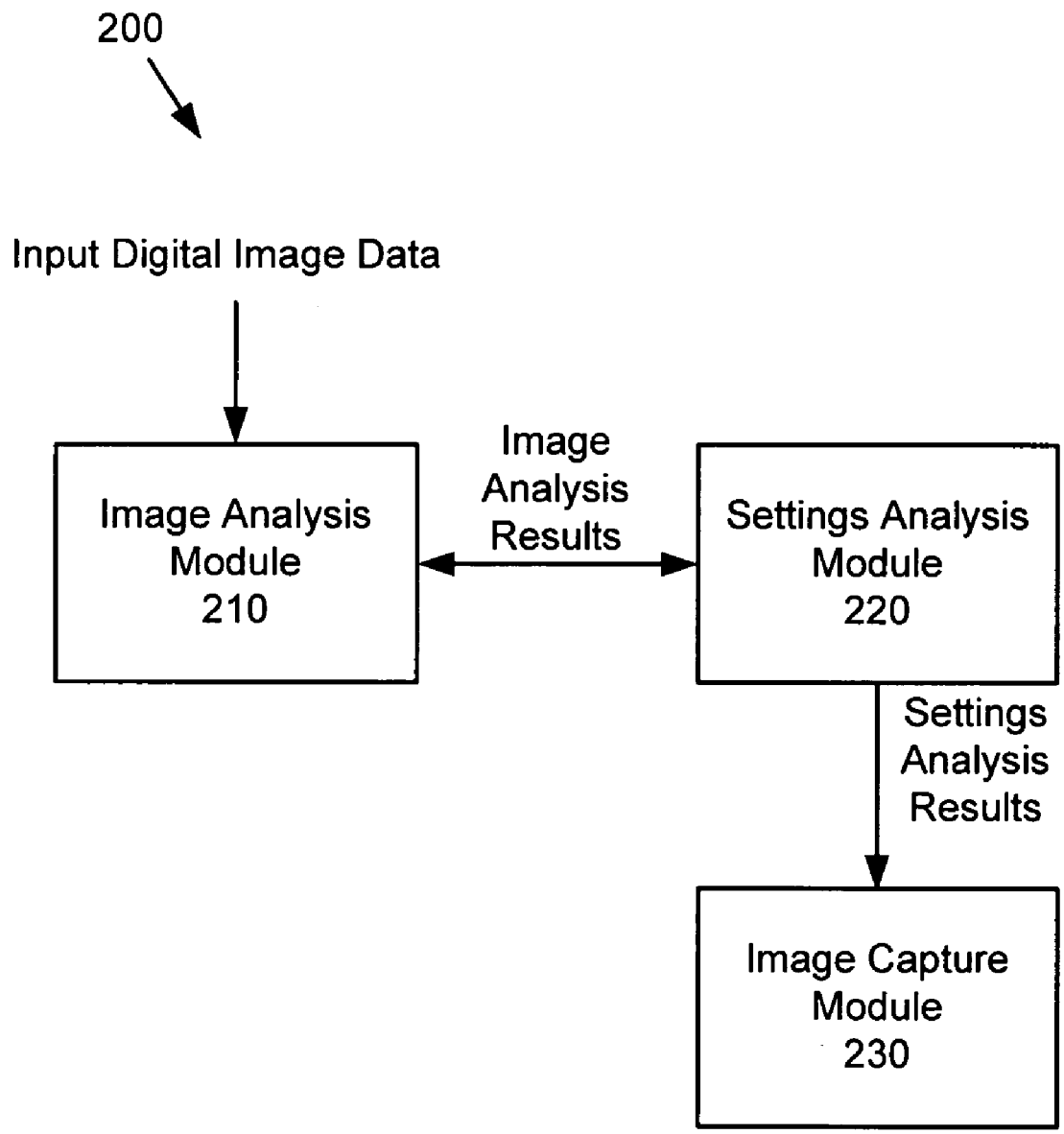
FIG. 2 illustrates an exemplary system for capturing an optimized image.

FIG. 2 illustrates an exemplary system 200 for capturing an optimized digital image. The system 200 includes an image analysis module 210, a settings analysis module 220, and an image capture module 230. In an exemplary implementation, the system 200 resides in an image capture device and can be implemented as software, hardware or a combination of both.

The image analysis module 210 receives input digital image data for a scene which a user wishes to capture. The digital image data can be analyzed to determine whether (and how) certain settings can be adjusted to capture an optimized image. In an exemplary implementation, the image analysis module 210 analyzes image data on a pixel-by-pixel basis and outputs the analysis results to the settings analysis module 220. An exemplary image analysis process will be described below with reference to block 320 of FIG. 3.

Based on the image analysis results, the settings analysis module 220 performs a settings analysis to determine whether any settings should be adjusted, how each setting should be adjusted, and how many digital images should be captured using the new settings to obtain at least one optimized image. An exemplary settings analysis process will be described with reference to block 330 of FIG. 3. The settings analysis module 220 outputs the settings analysis results to the image capture module 230.

The analyses results can be shared among the image analysis module 210 and settings analysis module 220. Further, the sequence of analysis illustrated in FIG. 2 is merely exemplary. One skilled in the art will recognize that, depending on design choice, the settings analysis may be performed prior to (or simultaneously with) the image analysis. For example, in the former implementation, a settings analysis may be triggered by a detection of an inconsistency in the settings of the input digital image data. The settings analysis may then be verified by performing an image analysis.

Based on the settings analysis results, the image capture module 230 operates the image capture device to capture the specified digital image(s) using the indicated settings. In an exemplary implementation, multiple digital images are captured.

An optimized image can be automatically selected from among all available captured images. Alternatively, an optimized image can be user-selected, for example, by presentation of image candidates to a user in a preview window.

Figure 3:
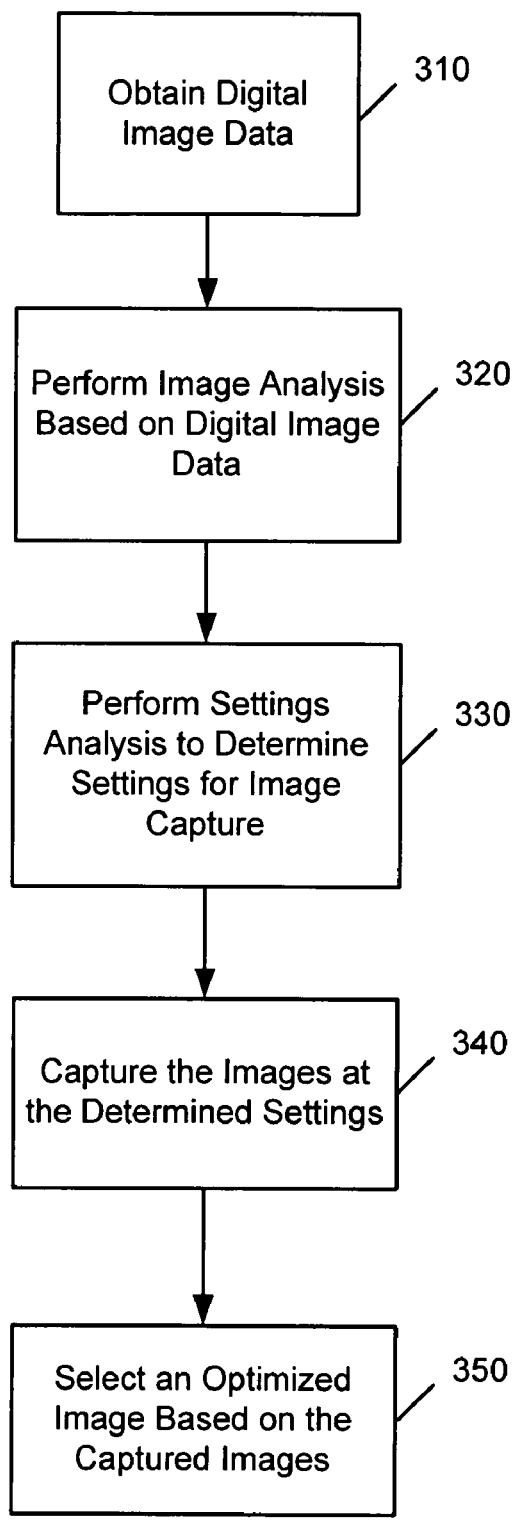
FIG. 3 illustrates an exemplary process for capturing an optimized image.

FIG. 3 illustrates an exemplary process for providing an optimized digital image based on one or more captured digital images.

At block 310, digital image data for a scene are obtained, for example, by the image capture device.

At block 320, an image analysis is performed by the image analysis module 210 based on the digital image data. In an exemplary implementation, if the digital image data are of a captured digital image, then the characteristics of image pixels can be analyzed to determine one or more image characteristics. For example, suppose the characteristic is exposure, an exposure of any pixel may be analyzed to determine if that pixel is underexposed or overexposed. In this example, data associated with each pixel in the image can be analyzed to determine how many black or white pixels are present in the image. For instance, if the red (R), green (G), and blue (B) values of a pixel are all zero, then the pixel is considered a black pixel. If the R, G, and B values of a pixel are at substantially maximum values, then the pixel is considered a white pixel. An image having a predominant number of black pixels is considered underexposed and an image having a predominant number of white pixels is considered overexposed. Similar analyses may be done to determine other characteristics (e.g., focus, white balance, etc.) of the pixels, and thus of the image.

The characteristics may (or may not) comprise settings available to the image capture device. For example, if the image was determined to be underexposed because the image includes predominantly black pixels, the settings of the image can be accessed to determine whether the flash was turned on when the image was captured. If the flash was not on, in a subsequent block (i.e., 340), the flash may be turned on to capture the optimized image.

At block 330, a settings analysis is performed (e.g., by the settings analysis module 220 based on the image analysis results) to determine any recommended actions. In an exemplary implementation, the settings analysis module 220 determines what settings can be changed, the values of the settings, and how many additional images to capture at those settings. Exemplary techniques for performing the analyses of blocks 320 and 330 are described in more detail in co-pending U.S. patent application Ser. No. 10/461,600, to Battles et al., assigned to the same assignee as the present application, which co-pending application is hereby incorporated by reference for all purposes.

The sequence of analysis illustrated in FIG. 3 is merely exemplary. One skilled in the art will recognize that, depending on design choice, the settings analysis may be performed prior to (or simultaneously with) the image analysis.

At block 340, the image capture module 230 executes the recommended actions (e.g., capturing additional one or more digital images with the specified settings for each image).

At block 350, an optimized image is selected (e.g., automatically or user-selected) from one the captured digital images. Any unselected images can be discarded or stored depending on design choice. In an exemplary implementation, the captured digital images may be analyzed by the image analysis module 210 to automatically determine the optimized image. Depending on design choice, when multiple digital images are captured, the user may have the option to view all of the images even if the optimized image has been automatically selected for the user.

IV. Exemplary System and Processes for Synthesizing an Optimized Image

A digital image is comprised of an array of pixels that describe a captured scene. Each pixel of the array represents a specific portion of the captured scene. When synthesizing an optimized image based on a plurality of images capturing a scene, one has to determine the pixel(s) in each image that correspond to each specific portion of the captured scene. Once such pixel correspondence determinations have been made, one can analyze all the pixel data for each specific portion of the scene, then determine improved data (e.g., by merging all useful data) for that portion of the scene. By repeating the foregoing for each portion of the scene, an optimized image for the entire captured scene can be determined. Exemplary techniques for determining corresponding pixels based on portions of scenes are described in more detail in co-pending U.S. application Ser. No. 10/824,692, to Chen, assigned to the same assignee as the present application, which co-pending application is hereby incorporated by reference for all purposes.

Figure 4:
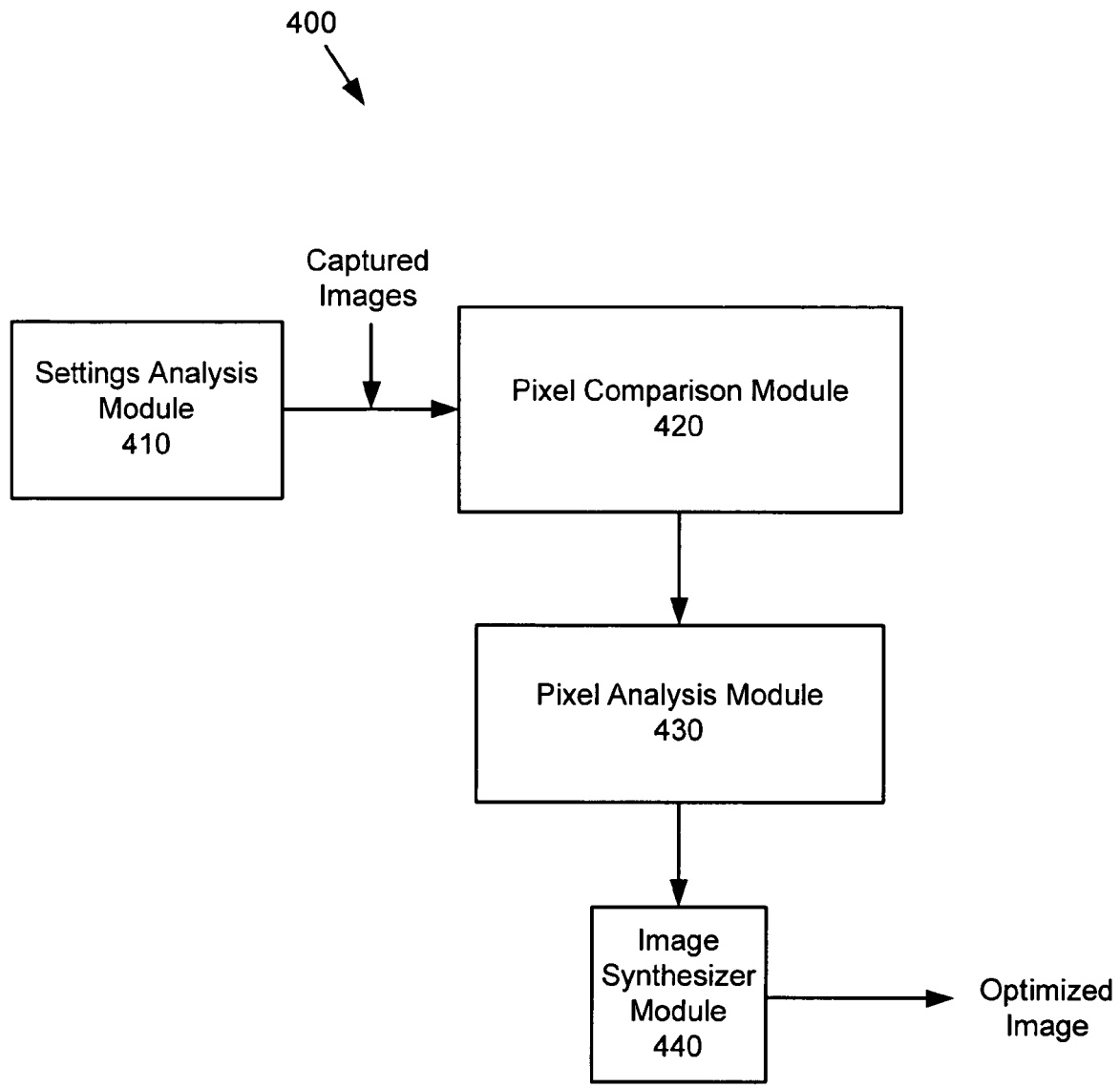
FIG. 4 illustrates an exemplary system for synthesizing an optimized image.

FIG. 4 illustrates an exemplary system 400 for synthesizing an optimized image based on a plurality of digital images, each image being captured with at least one setting value different from another image in the plurality of images.

The system 400 includes a settings analysis module 410 (which may or may not be the same module as the settings analysis module 220), a pixel comparison module 420, a pixel analysis module 430, and an image synthesizer module 440. In an exemplary implementation, the system 400 resides in an image capture device and can be implemented as software, hardware, firmware, or a combination thereof.

The settings analysis module 410 determines the settings to be used to capture a plurality of images that can be used to synthesize an optimized image. At least some of the settings for different images will preferably complement each other. For example, the digital image capture device might capture two backlit scenes, one with the flash (optimizing the foreground pixels) and another with the flash off (optimizing the background pixels). Data from these two images can then be merged to synthesize an optimized image with both optimized background and foreground pixels.

The settings for each image may be dynamically determined or predetermined. If dynamically determined, the settings analysis module 410 may automatically determine the appropriate settings in substantially real-time based on digital image data (e.g., obtained by taking a test digital image, by pressing the trigger half-way, etc.) of the scene to be captured. If predetermined, the settings can be automatically loaded from memory without regard to the characteristics of the scene and uniformly applied to all images regardless of scene type. Alternatively, the settings may be automatically loaded from memory, but specifically tailored to each scene type. The scene type may be user-specified in real time, automatically detected by the image capture device via optical sensors, or by other techniques (e.g., by employing the image analysis module 210 to analyze the digital image data). The image capture module 230 is then employed to capture the plurality of images with the settings specified by the settings analysis module 410.

The plurality of images of a scene captured at the settings specified by the settings analysis module 410 is sent to the pixel comparison module 420. The pixel comparison module 420 determines corresponding pixels of each of the plurality of images, and the relationships among the pixels. An exemplary pixel comparison process will be described below with reference to blocks 520 and 530 of FIG. 5.

The pixel analysis module 430 analyzes the plurality of images on a pixel-by-pixel basis to determine improved pixel values to be used to synthesize an optimized image. Exemplary pixel analyses will be described below with reference to block 540 of FIG. 5 and FIG. 6.

The image synthesizer module 440 synthesizes an optimized image based on the analyses performed by the pixel analysis module 430. Specifically, a new digital image (not selected from the plurality of images) is synthesized based on the plurality of images. An exemplary synthesis process will be described in more detail below with reference to block 550 of FIG. 5 and FIG. 9.

Figure 5:
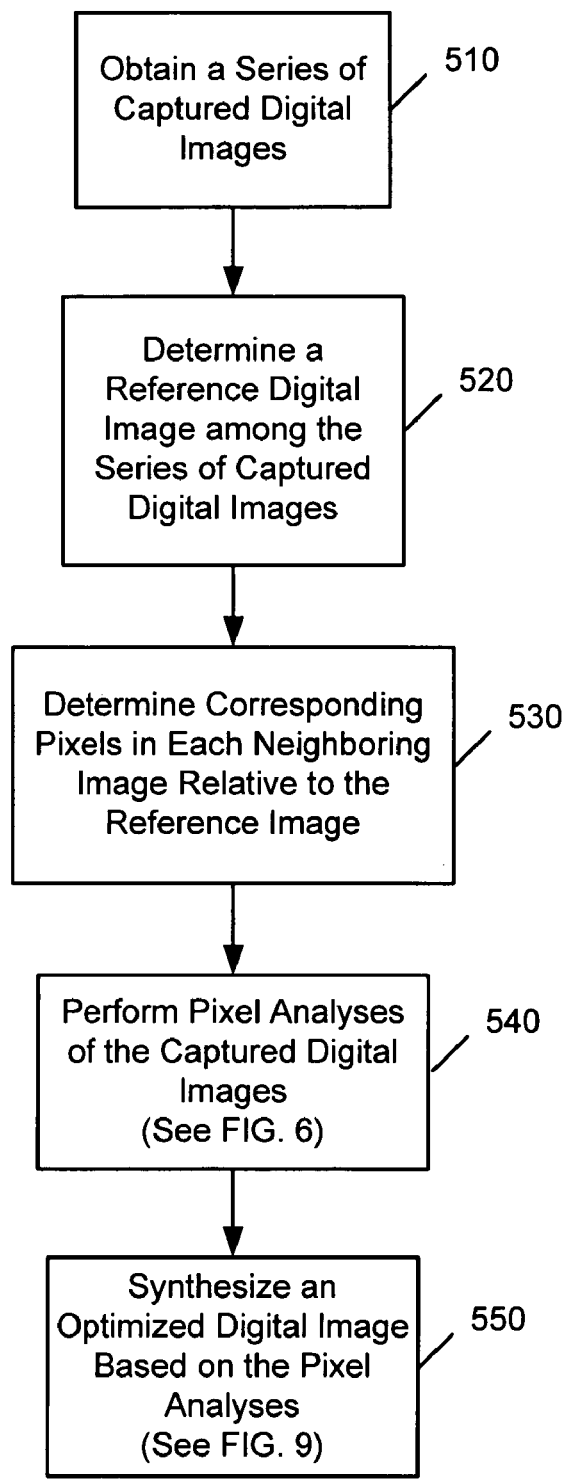
FIG. 5 illustrates an exemplary process for synthesizing an optimized image.

FIG. 5 illustrates an overview of an exemplary process for synthesizing an optimized image based on a plurality of digital images, each image being captured with at least one setting value different than the other digital images.

At block 510, a plurality of captured digital images is obtained. In an exemplary implementation, the plurality of captured digital images is captured with the setting values specified by the settings analysis module 410.

At block 520, a reference image is determined (automatically or user-specified) from the captured digital images. In an exemplary implementation, the reference image may be the image that best represents the scene. A reference image may be automatically selected by employing the image analysis module 210 to determine the best image among the plurality of images. For example, in an exemplary implementation, the reference image might be the image that is the least overexposed or underexposed. Virtually any other criterion can be implemented to select a reference image, depending on design choice. For ease of explanation, the captured images other than the reference image shall be referred to as neighboring images.

At block 530, pixel comparisons are performed to determine the relationships of pixels of neighboring images relative to the pixels of the reference image. In an exemplary implementation, the pixel correspondence determinations are performed by the pixel comparison module 420.

It is possible that some pixels in neighboring images will not correspond to any pixel in the reference image. In that case, those pixels of the neighboring images are not considered when synthesizing the optimized image. This is especially likely if the captured scene is a moving scene. Other factors such as movements of the image capture device can also cause some pixels in the neighboring images to be discarded.

In an exemplary implementation, for each pixel in the reference image, a comparison to all pixels of a neighboring image is made to determine which pixel of the neighboring image corresponds to the pixel in the reference image (if any). This process is repeated for all neighboring images to thereby determine pixel correspondence between the reference image and each of the neighboring images.

Depending on design choice for a particular implementation, a confidence score indicating the system's confidence in the validity of each pixel correspondence determination is assigned to each pixel of the neighboring images. The confidence scores can be used to improve the robustness and results of the optimized image.

Exemplary techniques for comparing pixels for determining corresponding pixels and confidence values are described in more detail in co-pending U.S. application Ser. No. 10/824, 692, to Chen, assigned to the same assignee as the present application, which co-pending application is hereby incorporated by reference for all purposes.

At block 540, pixel analyses are performed on pixels of the captured digital images to evaluate the pixel data. Exemplary pixel analyses will be described in more detail below with reference to FIG. 6.

At block 550, an optimized image is synthesized based on the pixel analyses. An exemplary synthesizing process will be described in more detail below with reference to FIG. 9.

Figure 6:
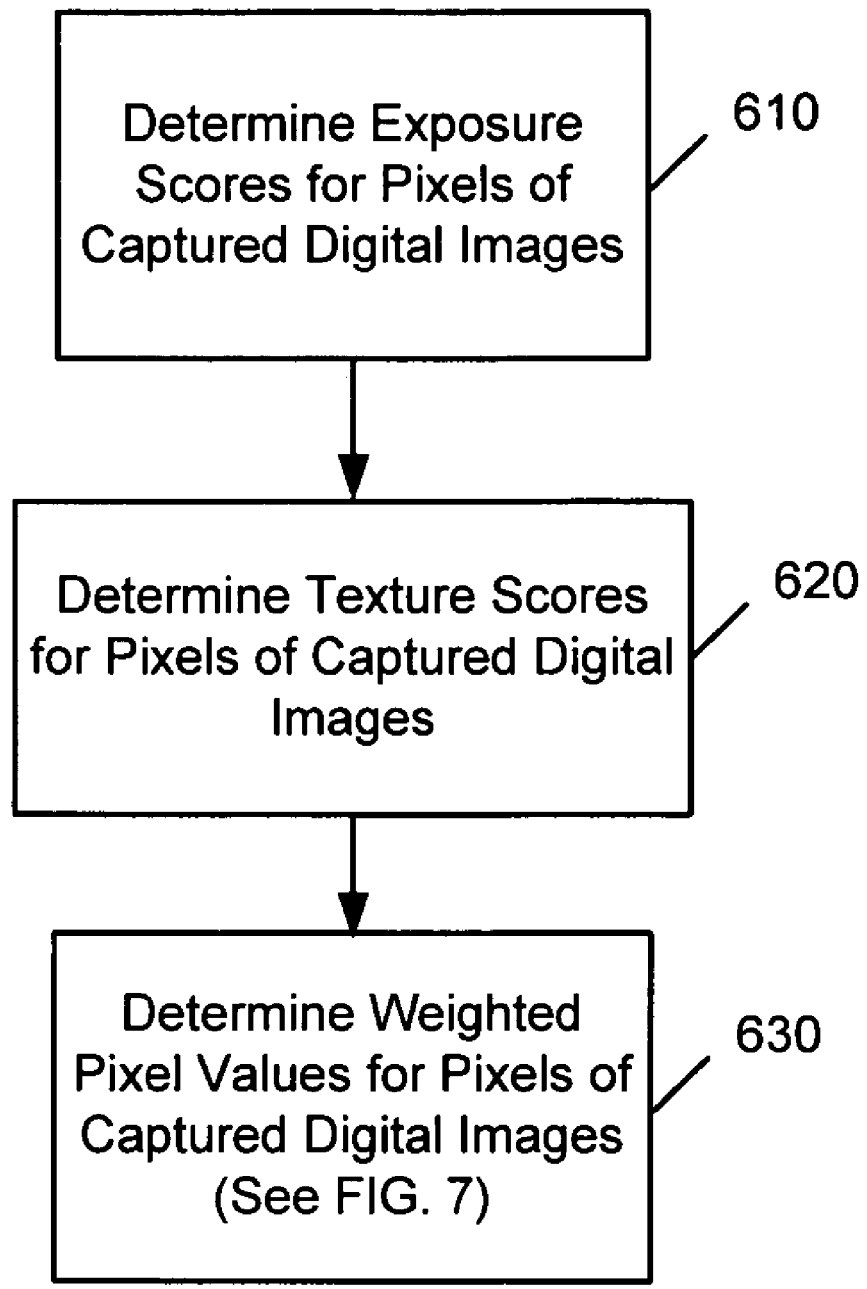
FIG. 6 illustrates an exemplary process for performing pixel analyses of pixels in a plurality of captured images.

FIG. 6 illustrates an exemplary process for analyzing a pixel of a captured digital image (e.g., pixel analysis of block 540).

At block 610, an exposure score is determined for a given pixel of an image. For example, if the pixel is a black or white pixel, it is respectively considered underexposed or overexposed. Thus, the pixel is assigned a score of zero. If the pixel is neither black nor white, it is assigned a score of 1.

At block 620, a texture score is determined for the pixel. For example, a pixel having a rich texture may be assigned a higher score than a pixel having a poor texture. Texture descriptors can be statistical, structural, or syntactic.

In an exemplary implementation where a statistical descriptor is used, for a small local region around each pixel, the standard deviation of the Laplacian filtering response, the skewness of the image gradient value distribution, or the edge frequency can be computed as measures of local texture content. Techniques for calculating these measures of texture content are either well known in the art or otherwise disclosed in co-pending application Ser. No. 10/824,692 to Chen, which co-pending application is incorporated by reference herein for all purposes. One skilled in the art will recognize that other measures of local texture content can be implemented depending on design choice.

If a pixel is determined to have high texture but most of its surrounding pixels have low texture, then that pixel's high texture is likely to be the result of noise. The pixel's texture value may be discarded and replaced by an average of the values of the neighboring pixels. The average may be an arithmetic average, a root-mean-square average, or some form of weighted average. In an exemplary implementation, a texture score for a given pixel is determined based at least in part on an assessment of the texture measures.

In an exemplary implementation, a threshold texture score is used so that a pixel having a texture score higher than or equal to the threshold score will be considered when synthesizing the optimized image and a pixel having a texture score lower then than the threshold score will not be considered.

At block 630, a weighted pixel value is determined for the pixel based on the confidence score, the exposure score and the texture score for the pixel. An exemplary process for determining the weighted pixel value for a pixel is described below with reference to FIG. 7.

The foregoing describes a process for analyzing a given pixel in a given one of the captured digital images. In an exemplary implementation, this exemplary pixel analysis is also performed on other pixels of the image, as well as on the pixels of the other images.

The process illustrated in FIG. 6 is merely exemplary. One skilled in the art will recognize that other pixel analysis for evaluating pixel data may be implemented in accordance with the specific requirements of an implementation.

Figure 7:
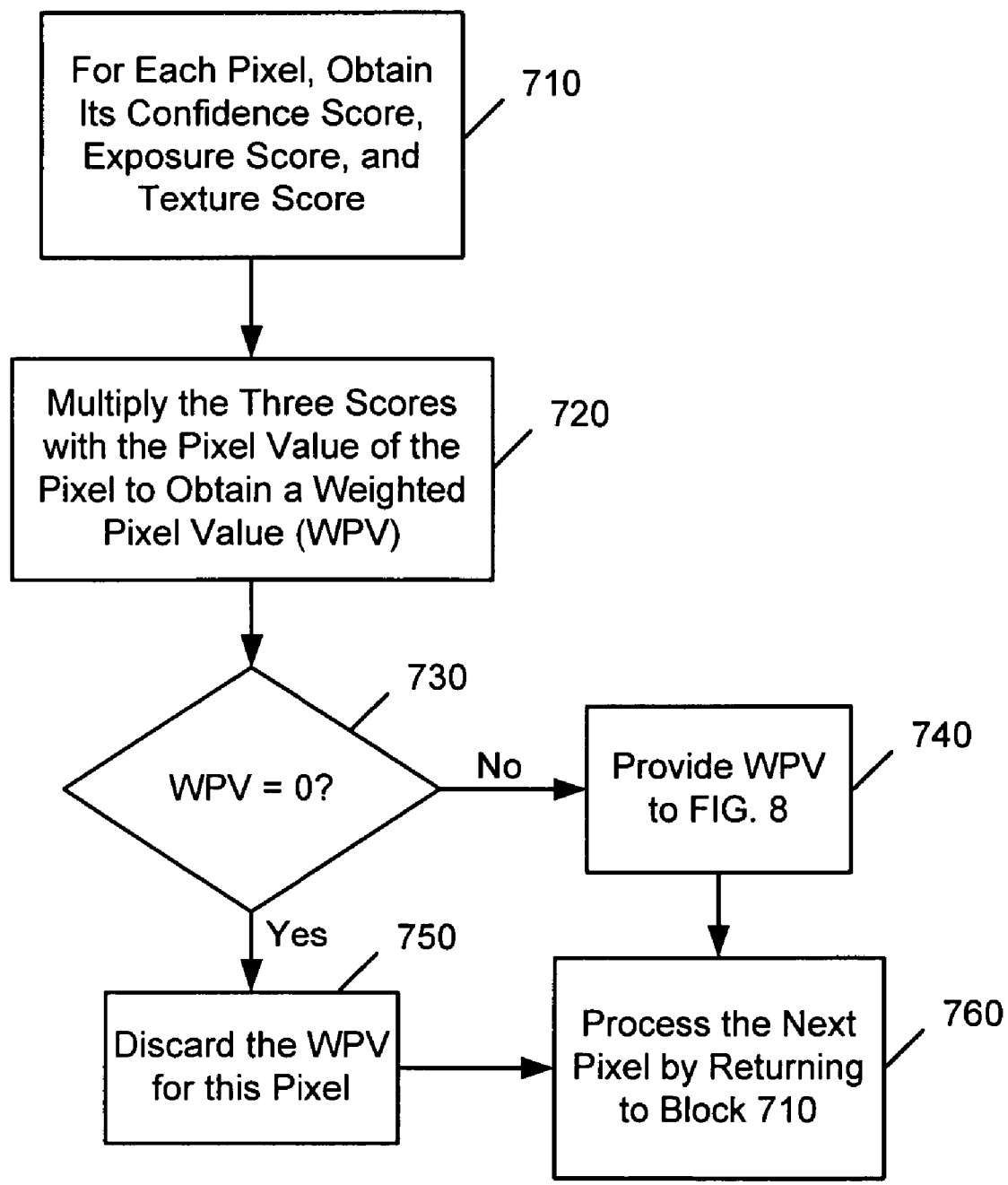
FIG. 7 illustrates an exemplary process for determining weighted pixel vales based on the pixel analyses of FIG. 6.

FIG. 7 illustrates an exemplary process for determining a weighted pixel value of a pixel of a captured digital image. In an exemplary implementation, the exemplary process is applied to all pixels of the image iteratively.

At block 710, the confidence, exposure, and texture scores for a pixel of a captured digital image are obtained. In an exemplary implementation, confidence scores for pixels in the reference image can be set to pre-determined values (e.g., the highest value within a range of values).

At block 720, the three scores and the value of the pixel are multiplied to obtain a weighted pixel value.

At block 730, whether the weighted pixel value is equal to zero is determined. For example, if the exposure score of a pixel is zero (e.g., if the pixel is a black or white pixel), then the weighted pixel value will be zero.

Figure 8:
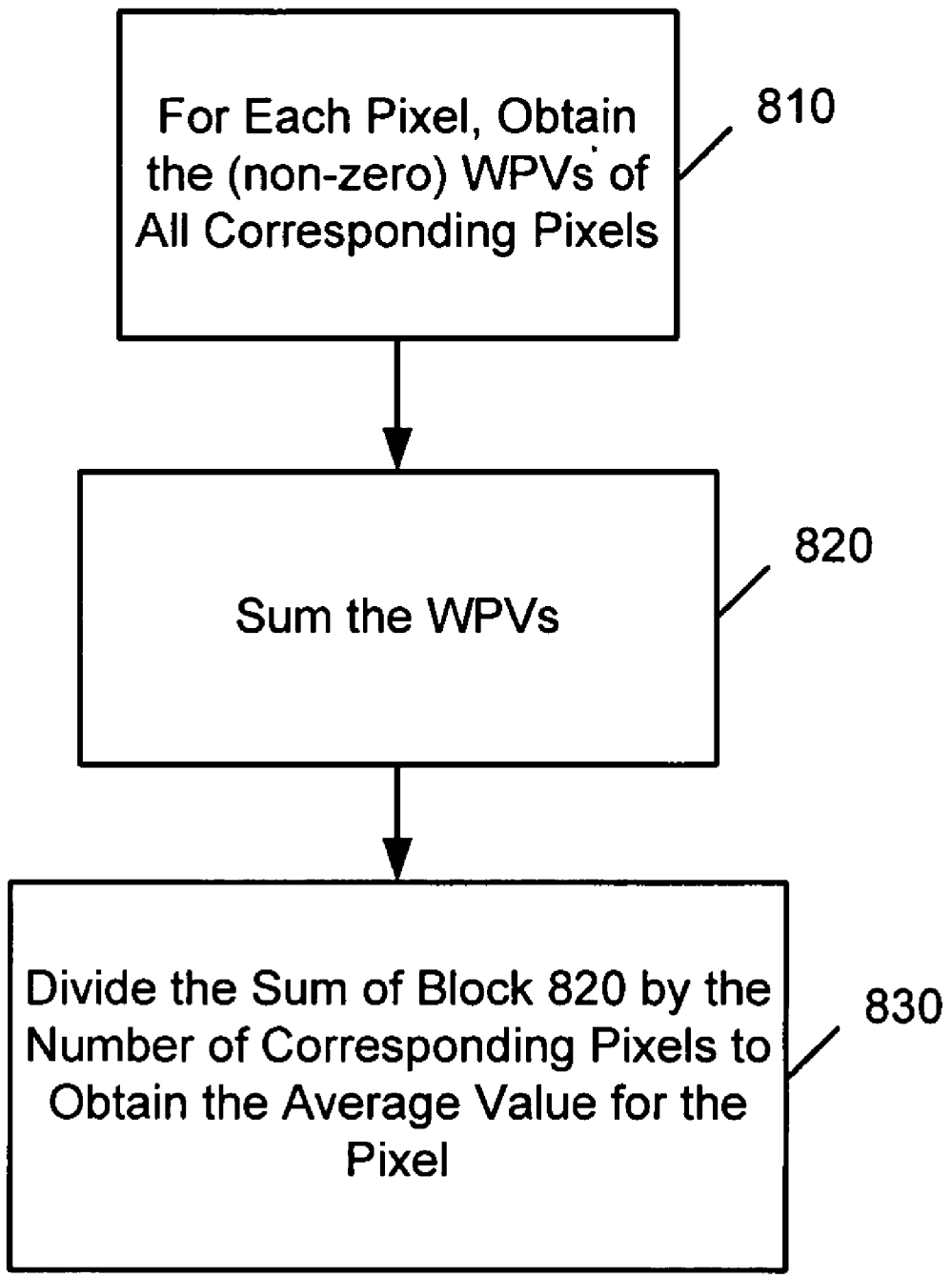
FIG. 8 illustrates an exemplary process for determining average pixel values.

At block 740, if the weighted pixel value is not equal to zero, the weighted pixel value is provided to block 810 of FIG. 8 and other pixels of the image are processed at block 760 to determine their weighted pixel values.

At block 750, if the weighted pixel value is equal to zero, the pixel value of that pixel is not considered when synthesizing the optimized image. At block 760, other pixels of the image are processed to determine their weighted pixel values.

After determining all the weighted pixel values of a given image, the process of FIG. 7 is repeated for determining weighted pixel values of pixels of other captured digital images, until all pixels of the captured digital images have been processed. The iterative process will be readily recognized by a person skilled in the art and need not be described in detail herein.

FIG. 8 illustrates an exemplary process for averaging corresponding pixel values to be used in creating the optimized image. In an exemplary implementation, the array of pixels in the reference image is copied to form a structure on which to build the optimized image At block 810, for each pixel in the (copied) reference image, all non-zero weighted pixel values of corresponding pixels of the captured digital images (including the weighted pixel value of that pixel in the reference image) are obtained (from the results of FIG. 7).

At block 820, for each pixel in the (copied) reference image, all non-zero weighted pixel values of corresponding pixels of the digital images are summed.

At block 830, the sum of block 820 is divided by the number of corresponding pixels to yield an average pixel value.

The process of FIG. 8 is repeated for all pixels of the reference image. The process described above is merely exemplary. One skilled in the art will recognize that other calculations may be implemented depending on design choice to determine pixel values of the optimized image based on the non-zero weighted pixel values of the corresponding pixels.

Figure 9:
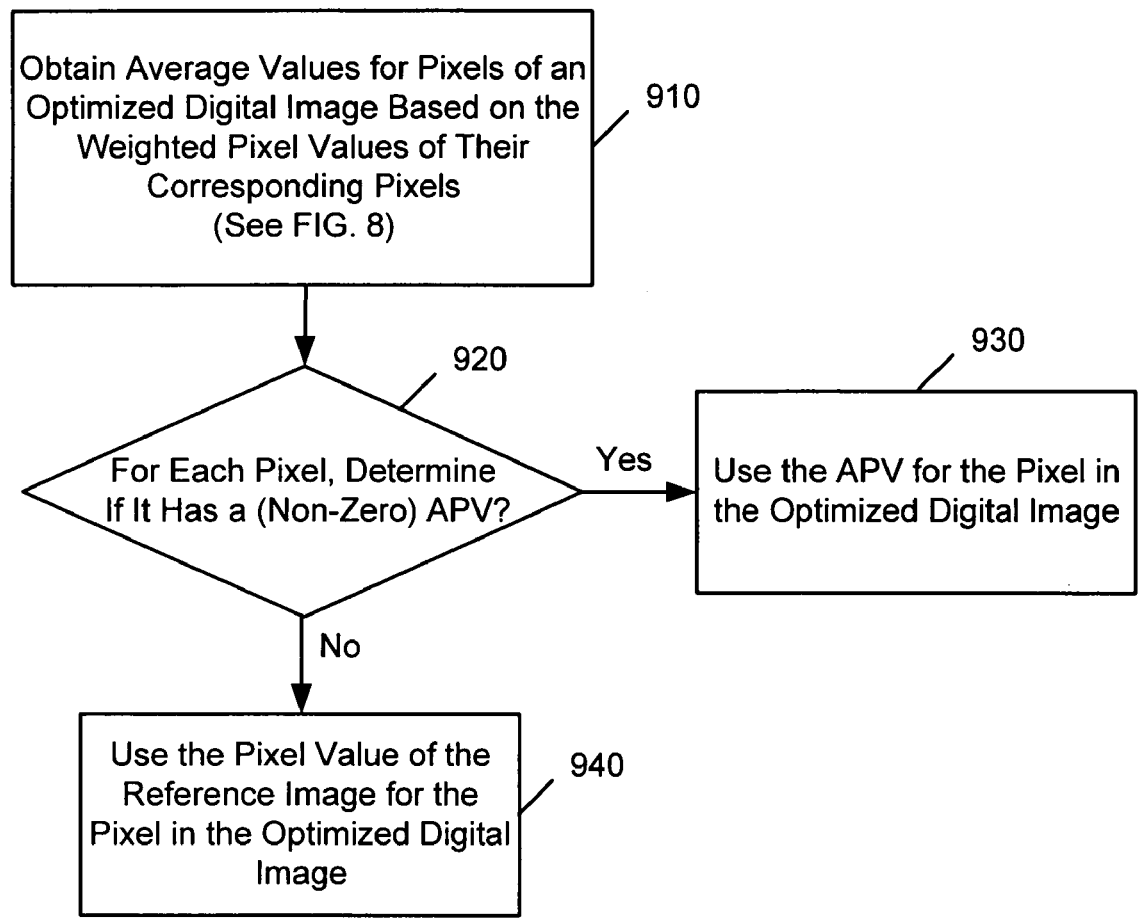
FIG. 9 illustrates an exemplary process for synthesizing an optimized image based on the average pixel values of FIG. 8.

FIG. 9 illustrates an exemplary process for synthesizing the optimized image.

At block 910, average values for pixels to be used in the optimized image are determined based on the (non-zero) weighted pixel values of corresponding pixels in the captured digital images, using the exemplary process described with reference to FIG. 8. In some instances, a pixel of the optimized image may not have an average value because it does not have any non-zero weighted pixel values (e.g., all exposure scores of the corresponding pixels are zero). Blocks 920-940 below provide an exemplary process for resolving this situation.

At block 920, for each pixel, whether there is a (non-zero) average pixel value for the pixel is determined.

At block 930, if so, the average pixel value is used for the optimized image in place of the corresponding pixel value of the (copied) reference image.

At block 940, if not, the corresponding pixel value of the reference image is used in the optimized image. Here, the corresponding pixel value of the reference image will remain unchanged.

The process of FIG. 9 is repeated for all pixels in the optimized image until the optimized image is synthesized.

The process described above is merely exemplary and many other variations can be implemented as a matter of design choice. For example, instead of replacing some pixel values in the reference image, pixel value replacement can be implemented on one or more portions of the reference image, while leaving other portions unchanged. Further, the pixel value replacement need not use a straight average as discussed above, but could use any form of weighted average based on corresponding pixels in some or all of the neighboring images. The weighting could be linear, logarithmic, or virtually any other type depending on design choice.

V. An Exemplary System and Operating Environment

The embodiments described herein may be implemented in an operating environment comprising software installed on a computer, in hardware, or in a combination of software and hardware.

The software and/or hardware would typically include some type of computer-readable media which can store data and logic instructions (which, when executed, implement the processes described herein) that are accessible by the computer or the processing logic within the hardware. Such media might include, without limitation, hard disks, flash memory, random access memories (RAMs), read only memories (ROMs), and the like.

VI. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alphanumeric identifiers to distinguish the elements thereof. Such identifiers are merely provided for convenience in reading, and should not necessarily be construed as requiring or implying a particular order of elements, or a particular sequential relationship among the claim elements.

What is claimed is:

1. A system for providing optimized digital images, comprising:
   a digital image capture device;
   an image analysis module configured to analyze characteristics of digital image data;
   a settings analysis module coupled to said image analysis module and configured to determine a number of digital images to capture and settings for each of said digital images, based on results obtained from said image analysis module;
   an image capture module coupled to said settings analysis module and configured to instruct said digital image capture device to capture said digital images at said determined settings; and
   computer-executable logic instructions configured to provide an optimized image based on said captured digital images, wherein said optimized image is synthesized based on said captured images, and wherein said optimized image is synthesized by replacing at least some pixels in said one of said captured images with an average of corresponding pixel values from others of said captured images.

2. The system of claim 1, wherein said image analysis module is further configured to determine the scene type to be captured by the digital image capture device based on said digital image data.

3. A computer-readable medium having stored thereon computer-readable logic instructions which when executed by a processor cause the processor to:
   receive and analyze image characteristics of digital image data obtained by a digital image capture device;
   determine a number of digital images to capture and settings for each of said digital images, based on results obtained from said image characteristics analysis;
   instruct said digital image capture device to capture the number of digital images at said determined settings; and
   provide an optimized image based on said captured digital images, wherein said optimized image is synthesized based on said captured images, wherein said optimized image is synthesized by replacing at least some pixels in one of said captured images with an average of corresponding pixel values from others of said captured images.

4. Apparatus for providing optimized digital images, comprising:
   means for capturing digital images;
   means for receiving and analyzing image characteristics of digital image data captured by said means for capturing digital images;
   means for determining a number of digital images to capture and settings for each of said digital images, based on results obtained from said digital image characteristics analysis;
   means for instructing said means for capturing digital images to capture said digital images at said determined settings; and
   means for providing an optimized image based on said captured digital images, wherein said means for providing an optimized image includes means for synthesizing an image based on said captured images, wherein said optimized image is synthesized by replacing at least some pixels in one of said captured images within an average of corresponding pixel values from others of said captured images.

5. A method for providing optimized digital images comprising:
   receiving and analyzing image characteristics of digital image data obtained by a digital image capture device;
   determining a number of digital images to capture and settings for each of said digital images, based on results obtained from said image characteristics analysis;
   instructing said digital image capture device to capture the number of digital images at said determined settings; and
   providing an optimized image based on said captured digital images, wherein said optimized image is synthesized based on said captured images, wherein said optimized image is synthesized by replacing at least some pixels in one of said captured images with an average of corresponding pixel values from others of said captured images.

6. The method of claim 5, wherein said analyzing image characteristics further comprises determining the scene type to be captured by the digital image capture device based on said digital image data.

* * * * *